Jan. 13, 1970  K. R. M. KARLSTROM  3,489,432
REMOTE UNHITCHING DEVICE FOR DRIVERLESS
TRACTORS AND THE LIKE

Filed May 9, 1967  2 Sheets-Sheet 1

INVENTOR.
KARL R.M. KARLSTROM
BY
Barnes, Kisselle, Raisch & Choate
ATTORNEYS

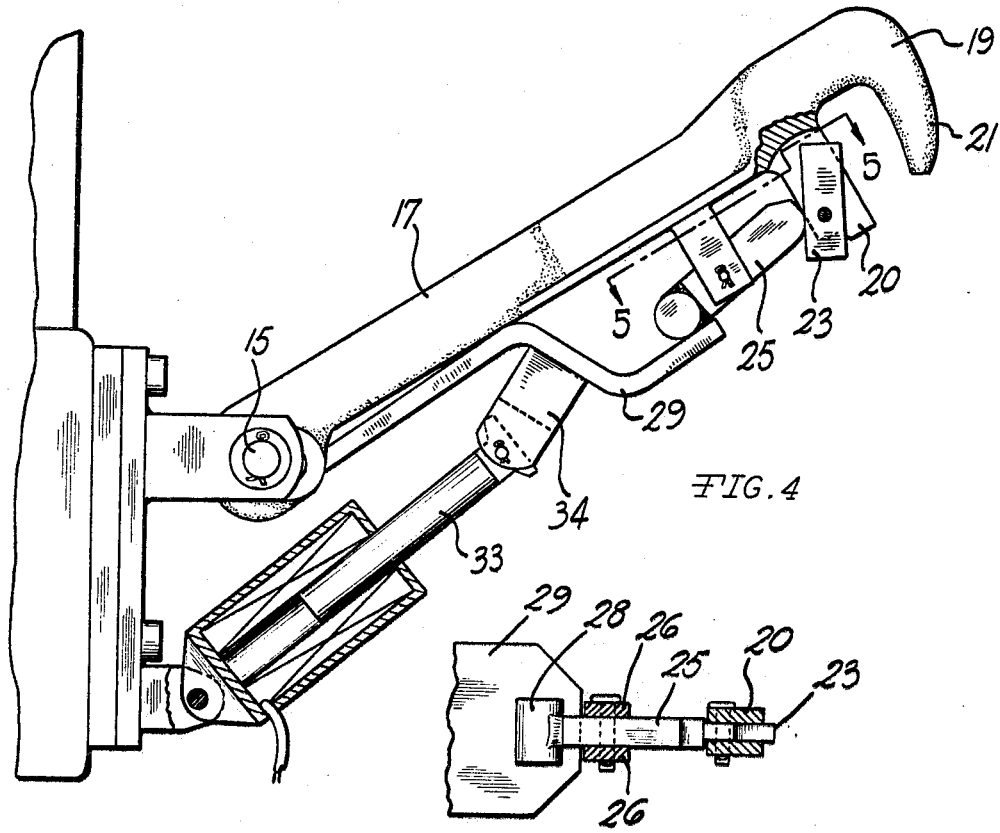
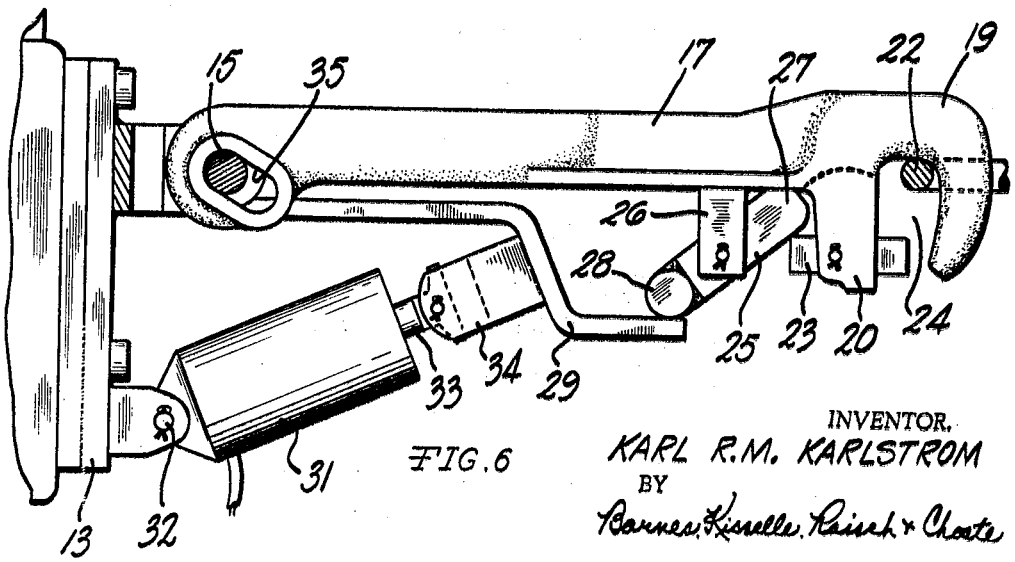

United States Patent Office 3,489,432
Patented Jan. 13, 1970

3,489,432
REMOTE UNHITCHING DEVICE FOR DRIVERLESS TRACTORS AND THE LIKE
Karl R. M. Karlstrom, Roseville, Mich., assignor, by mesne assignments, to American Chain & Cable Company, Inc., New York, N.Y., a corporation of New York
Filed May 9, 1967, Ser. No. 637,290
Int. Cl. B60d 1/10, 1/04
U.S. Cl. 280—504                    12 Claims

ABSTRACT OF THE DISCLOSURE

The driverless tractor described herein comprises an unhitching device which includes a hitch bar that is pivoted to the rear of the tractor and has a downwardly extending C-shaped hook for engaging with an opening in a succeeding trailer or the like. A latch lever normally closes the opening in the downwardly extending hook to prevent inadvertent disengagement of the hitch bar. An actuator plate is pivoted to the tractor and operated by a linear actuator to first cause a release lever to move the latch lever out of latching position and thereafter swing the hitch bar upwardly out of engagement with the opening of the succeeding vehicle. The actuator is remotely operated by a signal derived from the driverless tractor or from some other device.

---

This invention relates to unhitching devices and particularly to a remotely operated unhitching device for unhitching a driverless tractor from trailers or other vehicles which are towed by said driverless tractor.

Background of the invention

In the handling of materials, it is common to use driverless tractors with tow trailers or other devices having materials thereon and deliver them to selective remote points. The driverless tractors are programmed and follow either painted stripes, embedded magnetic or electrical wires or other signal devices to the programmed destination. Upon arrival at a destination, it is desirable to be able to release the trailers upon signal.

Accordingly, it is an object of the invention to provide a remotely controlled unhitching device for driverless tractors which will release and unhitch the trailers or other vehicles being towed by the driverless tractors; which device is relatively simple, foolproof and relatively inexpensive.

Summary

The driverless tractor described herein comprises an unhitching device which includes a hitch bar that is pivoted to the rear of the tractor and has a downwardly extending C-shaped hook for engaging with an opening in the succeeding trailer or the like. A latch lever normally closes the opening in the downwardly extending hook to prevent inadvertent disengagement of the hitch bar. An actuator plate is pivoted to the tractor and operated by a linear actuator to first cause a release lever to move the latch lever out of latching position and thereafter swing the hitch bar upwardly out of engagement with the opening in the succeeding vehicle. The actuator is remotely operated by a signal derived from the driverless tractor or from some other device.

Description of the drawings

FIG. 4 is a fragmentary side elevational view of the unhitching device showing it in unhitched position.

FIG. 5 is a fragmentary sectional view taken along the line 5—5 in FIG. 4.

FIG. 6 is a view similar to FIG. 4 showing the device in hitched position.

Description

Figure 1:
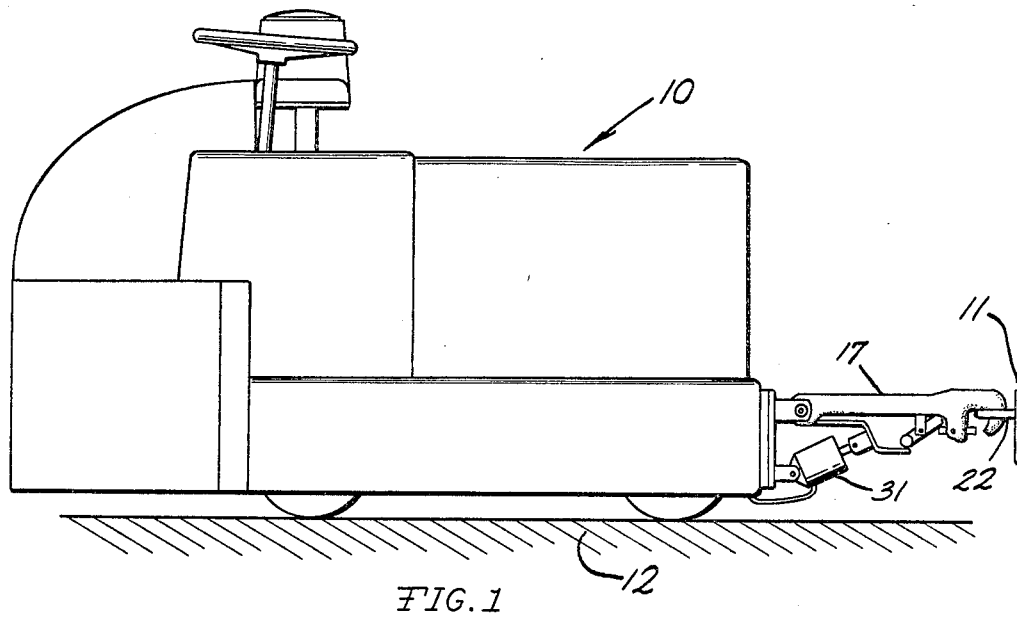
FIG. 1 is a side elevational view of a driverless tractor embodying the invention.
Figure 2:
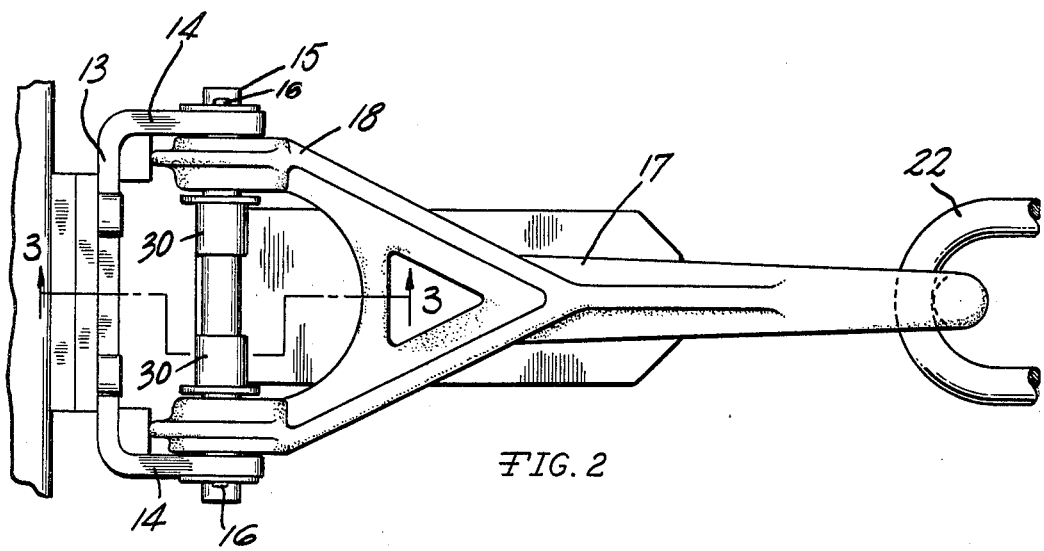
FIG. 2 is a fragmentary plan view on an enlarged scale of the unhitching device of the tractor shown in FIG. 1.
Figure 3:
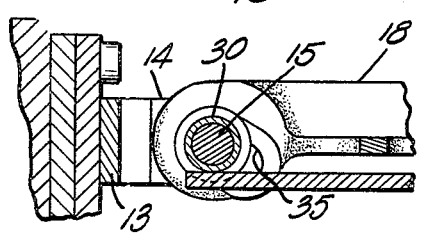
FIG. 3 is a fragmentary sectional view taken along the line 3—3 in FIG. 2.

Referring to FIG. 1, the invention relates to a device for hitching and unhitching a driverless tractor 10 from a trailer or similar vehicle 11 that is being towed by the driverless tractor 10. The driverless tractor 10 can be of any conventional remotely controlled type wherein the vehicle follows either a visible line along the floor 12 or embedded magnetic or electrical wires or other signal devices. When the tractor 10 reaches a predetermined destination, it may be desired to unhitch the trailer 11 from the tractor and release the trailer at the destination.

In accordance with the invention, a bracket 13 is mounted on the rear of the tractor 10 and comprises spaced vertical flanges 14 which support a horizontal pivot pin 15 that is retained in position by cotter pins 16. A hitch bar 17 having spaced pivot arms 18 is pivoted to the pivot pin 15 for swinging movement about the horizontal axis of the pivot pin 15. The rear end of the hitch bar 17 is formed with a downwardly opening C-shaped hook 19 comprising spaced fingers 20, 21. The hook 19 is adapted to extend over a horizontal loop 22 on the front of the trailer 11 with the finger 21 in the opening in the loop to pull the trailer.

A latch lever 23 is pivoted to the forward finger 20 and normally extends horizontally as shown in FIG. 6 to close the bottom of the opening 24 of the hook 19 and prevent inadvertent upward movement of the bar 17 and resultant disengagement.

A release lever 25 is pivoted between flanges 26 which extend downwardly from the hitch bar 17. The release lever 25 normally has its rear end 27 extending above and engaging the forward end of the latch lever 23. The forward end 28 of the release lever 25 is formed with a rounded or cylindrical shape for engagement with the surface of an actuator plate 29 that is pivoted about the axis of pivot pin 15 by integral sleeves 30 on the pivot pin 15. An electrical linear actuator 31 is pivoted at one end by a pin 32 to the bracket 13 and has its shaft or armature 33 pivoted between flanges 34 fastened to an intermediate portion of the actuator plate 29.

As shown in FIG. 6, when the hitch bar 17 is in engagement with the loop 22, the parts have the position shown, namely, the latch lever 23 extends generally horizontally closing the opening 24. When a signal is received by the actuator 31, the armature 33 thereof is extended to the position shown in FIG. 4. As the armature moves outwardly, it first pivots the actuator plate 29 and, in turn, the release lever 25 to swing the latch lever 23 to the position shown in FIG. 4 thereby moving it out of position so that the hitch bar 17 can freely swing upwardly. Further movement of the armature 33 causes the actuator plate 29 to engage the bottom surface of the hitch bar 17 and swing the hitch bar upwardly to cause the hook 19 to disengage from the loop 22.

As shown in FIG. 6, the arms 18 which pivot the hitch bar 17 to the pin 15 are formed with elongated openings 35 which permit some longitudinal movement of the hitch bar 17 so that the hitch bar will become locked in the elevated or vertical position.

I claim:
1. For use with a driverless tractor or the like, the combination comprising a hitch bar adapted to be movably mounted at one end of said tractor or the like, means on said hitch bar for engaging another vehicle, latch means on said hitch bar for locking said last-mentioned means, an actuator, means interposed between said actuator and said latch means operable by said actuator for first unlatching said latch means and thereafter engaging and moving said hitch bar out of engagement with said other vehicle.

2. The combination set forth in claim 1 wherein said means on said hitch bar comprises a downwardly extending hook.

3. The combination set forth in claim 2 wherein said latch comprises a pivotally mounted member movable into position for closing said C-shaped hook and preventing removal of an element engaged thereby.

4. The combination set forth in claim 1 wherein said last-mentioned means operable by said actuator includes an actuator bar, a release lever mounted on said hitch bar movable by said actuator bar to disengaged said latch lever by moving said latch lever out of position wherein it closes the bottom of said hook.

5. The combination set forth in claim 1 wherein said actuator comprises a linear actuator.

6. The combination set forth in claim 2 wherein said hitch bar is pivoted and said actuator is pivoted.

7. For use with a driverless tractor or the like, the combination comprising, a hitch bar adapted to be pivotally movably mounted for movement about a horizontal axis at one end of said tractor or the like, means on said hitch bar for engaging another vehicle, latch means on said hitch bar for locking said last-mentioned means, an actuator, means interposed between said actuator and said latch means operable by said actuator for first unlatching said latch means and thereafter engaging and swinging said hitch bar upwardly out of engagement with said other vehicle.

8. The combination set forth in claim 7 wherein said means on said hitch bar comprises a downwardly extending hook.

9. The combination set forth in claim 2 wherein said latch comprises a member pivoted on said hitch bar and movable into position for closing said C-shaped hook and preventing removal of an element engaged thereby.

10. The combination set forth in claim 9 wherein said last-mentioned means operable by said actuator includes an actuator bar pivoted about the pivotal axis of said hitch bar, a release lever pivoted on said hitch bar and movable by said actuator bar to disengage said latch lever by pivoting said latch lever out of position wherein it closes the bottom of said hook.

11. The combination set forth in claim 7 wherein said actuator comprises a linear actuator having one end pivoted to said actuator bar and the other end adapted to be pivoted to said tractor.

12. The combintion set forth in claim 7 wherein said hitch bar has limited longitudinal movement relative to its pivotal axis.

References Cited

UNITED STATES PATENTS

| | | | |
|---|---|---|---|
| 2,392,368 | 11/1946 | Dilbert | 280—504 |
| 2,577,145 | 12/1951 | Wearing et al. | 280—504 |
| 2,703,244 | 3/1955 | Wearing | 280—504 |
| 2,727,757 | 12/1955 | Sawyer et al. | 280—504 |

BENJAMIN HERSH, Primary Examiner

J. E. SIEGEL, Assistant Examiner